Feb. 14, 1950 N. COSAKIS 2,497,153
AIRPLANE PASSENGER CARRIER
Filed June 25, 1946 2 Sheets-Sheet 1

INVENTOR:
NICOLAS COSAKIS,
ATTORNEYS,

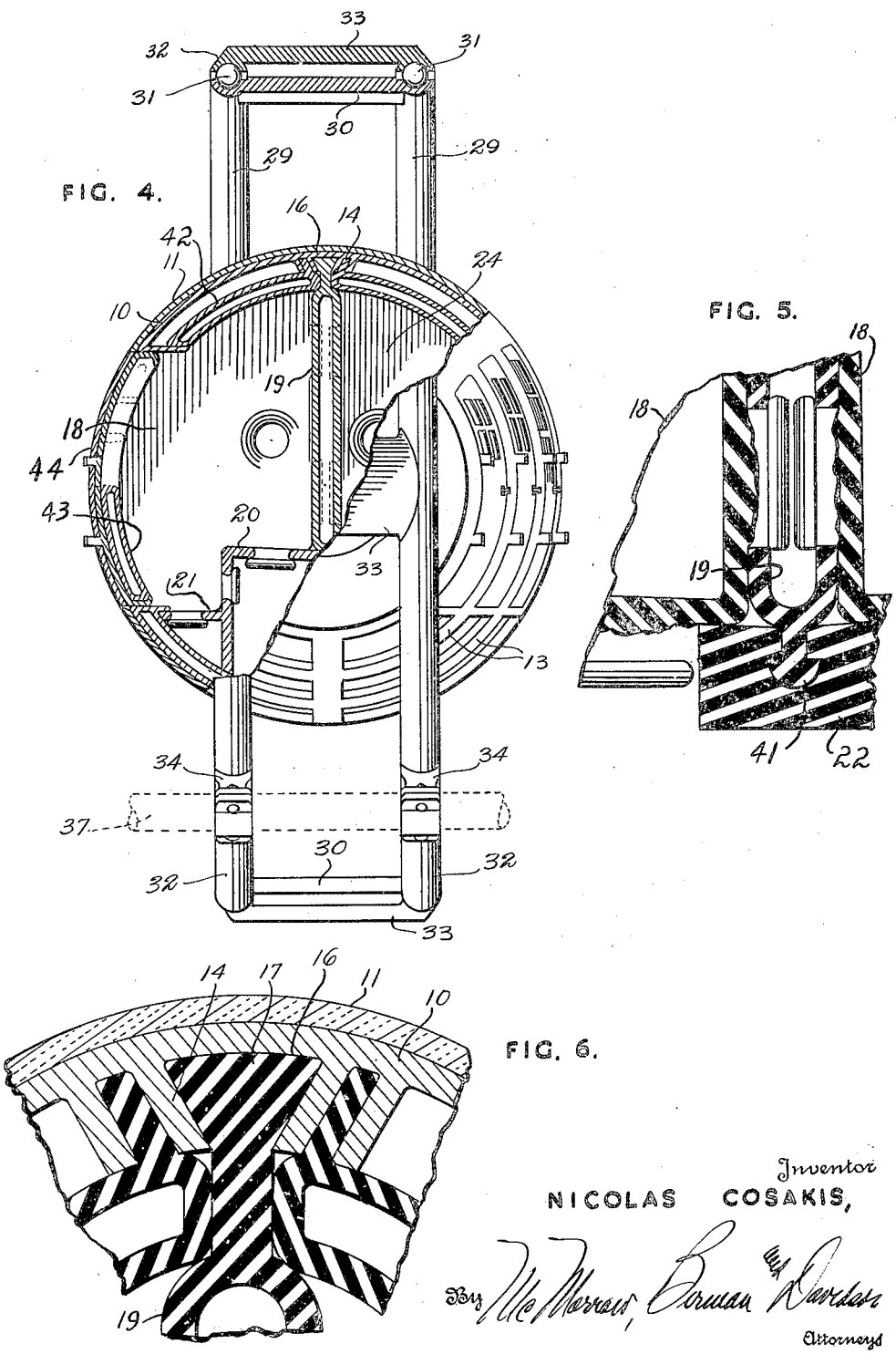

Patented Feb. 14, 1950

2,497,153

UNITED STATES PATENT OFFICE 2,497,153

AIRPLANE PASSENGER CARRIER

Nicolas Cosakis, Cairo, Egypt

Application June 25, 1946, Serial No. 679,164

3 Claims. (Cl. 244—118)

The present invention relates to passenger carriers for airplanes and is more particularly concerned with an attachable fire and shock resisting carrier.

The primary object of the invention is to provide a separable passenger carrier which is constructed to minimize fire and shock hazards incident to airplane accidents.

Another object of the invention is to provide a carrier of the character referred to which is self-stabilizing in relation to the varying positions of the airplane, longitudinally and laterally.

A further object of the invention is to provide a device of the character referred to of simpler and more compact construction than prior devices.

With the foregoing and other objects and advantages in view the invention consists of the novel construction and arrangement of parts hereinafter described and claimed.

In the accompanying drawings illustrating the preferred embodiment of the invention, Figure 1 is a fragmentary vertical longitudinal section of an airplane passenger carrier constructed in accordance with the invention.

Figure 4 is an end elevation of the carrier partly in section, transversely.

Figure 5 is an enlarged fragmentary section showing the fastening means at the bottom of the longitudinal pneumatic partition mat or cushion.

Figure 6 is a similar view of the upper fastenings means for the partition mat or cushion.

Like numerals, as used in the description and drawings, designate the same parts of construction.

Figure 1:
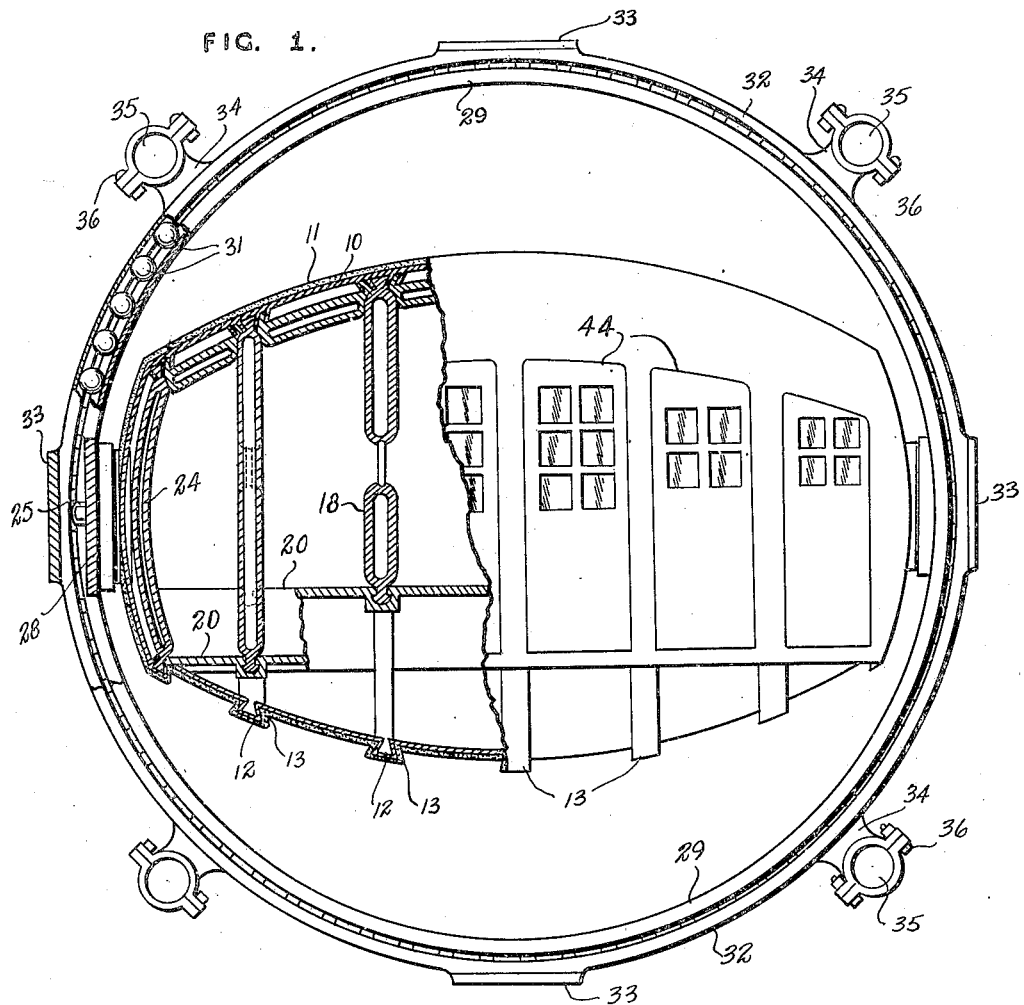
Figure 2:
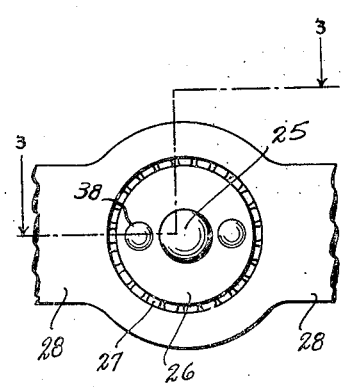
Figure 2 is a fragmentary end elevation of a cross truss of the rotor frame, showing the journal in each for the carrier's axial support.
Figure 3:
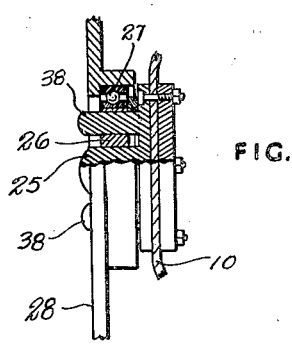
Figure 3 is a transverse section on line 3—3 of Figure 2.

In its barest essentials the invention comprises a fire-resisting and shock-absorbing ovoid passenger cabin or carrier, mounted revolvably at its polar axis in a rotor designed to be housed perpendicularly in a concentric frame which is attached to an airplane, thus providing longitudinal and lateral adjustment or freedom of pitching and rolling movement to stabilize the normal position of the carrier and maintain the same, when deviations of the airplane from a level position occur longitudinally or laterally.

The body 10 of the passenger carrier is constructed of aluminum or other suitable metal and, preferably, is ovoid in shape, as shown. It carries over the exterior a thick fire-resisting covering 11 of asbestos or other suitable material, and is provided with suitable doors and windows with shatter proof glass.

While ovoid shape is preferred, other designs or contours for body 10, such as spherical, cylindrical and rectangular, may be employed, as desired.

The body is provided exteriorly with spaced annular ribs 12, positioned transversely and having inclined or undercut walls to engage similarly fashioned annular channels of rubber rings 13, which served as shock-absorbers.

Interiorly the body is provided along the ceiling with an integral longitudinal rib 14 and a plurality of integral arcuate ribs 15 on the inner wall, disposed transversely and suitably spaced apart. Said ribs are channeled longitudinally with the side walls thereof inclined and convergent towards the slots of the channels to serve as one element of a tongue and groove joint, the other element being angular tongues 17 on the interior pneumatic pads, 18 and 19. The former are thus fastened to the ribs on the interior walls, while the latter is arranged to depend longitudinally between seats 20 and divide the carrier into two compartments extending lengthwise thereof.

The seats are preferably bench-like and provided with foot rests 21. Each bench is preferably constructed as a rubber unit and arranged longitudinally back to back to provide seats on each side of the rubber partition, facing outward. The said pneumatic partition pad 19 passes down to the line between the benches and is anchored at the bottom edge by means of tongues 41 which engage in pockets 22 secured to the undersides of the two benches. At each end of the cabin is an annular pneumatic mat 24, secured in place by ribs, as aforesaid, as further protective means. The transverse partitions 18 are generally semi-circular in shape and are secured to the seat structure, the seat back and the interior of the hollow body to divide the longitudinal space at each side of back cushion 19 into individual passenger compartments. A pneumatic cushion 42 is secured to the body above each passenger compartment and a cushion 43 is secured on the inner side of each door 44.

The passenger cabin 10 is provided on each end and in alignment with its longitudinal axis with fixed stud axles 25 which are mounted in hub discs 26, designed to bear a fixed relation to the shafts but to be revolvable in ball-races 27 set in transverse trusses 28 of an annular frame which serves as a rotor.

This frame comprises dual concentric rings 29 encircling the ovoid cabin and braced horizontally by the aforesaid trusses and vertically by two diametrically opposed trusses 30. The dual rings are channeled on their peripheries for the reception of ball-bearings 31 designed to be contained in annular tracks or races in the dual rings of a larger but concentric annular outer frame 32, the said two frames being in juxtaposition to provide the ball-bearing tracks aforesaid and thus serve as the suspending means for the rotor-like member which holds the cabin.

The exterior dual rings are suitably trussed transversely at suitable intervals, preferably quarterly, as at 33, and each is provided on its periphery with four equi-distant ears 34, arranged intermediate the trusses. These ears project outwardly and are provided with transverse apertures 35. They are preferably split and one section is a clamping member which is secured in place by threaded bolts 36.

The holes 35 in said ears are in juxtaposition to receive four parallel suspension bars, secured transversely to the underside of an airplane, one being indicated in dotted lines at 37 in Figure 4. They support the outer frame 32 in fixed relation perpendicularly and in a vertical plane with the longitudinal axis of the airplane. When it is desired for any reason to dismount the cabin and its said concentric ring frames, the bolts 36 of the ears 34 are removed and the outer ring taken off the transverse bars 37.

It should be obvious from the foregoing description that in operation, the passenger cabin is not subject to the inclinations of the airplane in transit. If the plane's deviation from level is longitudinal the exterior frame 32 will rotate on the roller bearings to compensate therefor and if the inclination of the airplane is lateral, the interior frame or ring 29 will rotate on the hubs 26 of the axles of the cabin sufficiently to compensate, thus providing for automatic stabilization of the cabin's position in the air and preventing pitching and tossing thereof. The hubs 26 are fixed in relation to the axles of the cabin by means of diametrically disposed studs 38 projecting from the nose plates of the cabin and through said hubs.

As different embodiments may be made of this inventive concept and modifications may be made in the embodiment hereinbefore shown and described, it will be understood that the matter herein is to be interpreted as illustrative merely, and not in a limiting sense.

What I claim is:

1. A passenger compartment assembly for aircraft comprising a pair of spaced-apart, coaxial outer rings of substantially the same diameter, said outer rings having respective annular ball channels in their inner sides, means securing said outer rings together in substantially parallel relationship, means carried by said outer rings for securing said assembly to the structure of an aircraft, a pair of inner rings disposed one within each of said outer rings, each of said inner rings having an annular ball channel complementary to the ball channel in the corresponding outer ring, anti-friction balls in said channels, means securing said inner rings together in substantially parallel relationship including a pair of diametrically-opposed, annular ball races, a respective hub disc rotatably mounted in each of said ball races, a hollow, elongated body disposed within said inner rings and secured at its ends to said hub discs so that its longitudinal centerline is substantially coincident with the common axis of rotation of said hub discs, a pneumatic cushion structure providing a pair of contiguous bench seats extending longitudinally of said body, pneumatic cushion means secured at its top edge to the top of the interior of said body and at its lower edge to said seat structure between said seats providing a back for said seats, a pair of pneumatic cushion structures providing internal end walls for said body, a plurality of generally semi-circular pneumatic cushions secured at their edges to the respective seats, said seat back and the interior of said body constituting partitions between individual passenger compartments, and doors in each side of said body disposed one in each individual passenger compartment.

2. A shock-and-fire-resistant passenger compartment for an aircraft comprising an elongated metallic body of circular cross-sectional shape, a covering of fire-resistant material over said body, doors in the sides of said body, and pneumatic cushion means secured within said body to provide individual shock-resistant passenger compartments therein, one opposite each of said doors, said pneumatic cushion means comprising a seat structure in the lower portion of said body, a seat back extending from said seat structure to the top of said body, partition members between the individual passenger compartments, a cushion extending over the top of each passenger compartment, and a cushion on the inner side of each door.

3. In combination, a shock-and-fire-resistant passenger compartment for aircraft, and mounting means therefor, said compartment comprising an elongated metallic body of circular cross-sectional shape, a covering of fire-resistant material over said body, doors in the sides of said body, and pneumatic cushion means secured within said body to provide individual shock-resistant passenger compartments therein, one opposite each of said doors, said pneumatic cushion means comprising a seat structure in the lower portion of said body, a seat back extending from said seat structure to the top of said body, partition members between the individual passenger compartments, a cushion extending over the top of each compartment, and a cushion on the inner side of each door, and said mounting means comprising means operative to secure said compartment to an aircraft for freedom of rolling and pitching movement whereby said compartment may retain its gravitational position regardless of any temporary attitude of the airplane.

NICOLAS COSAKIS.

REFERENCES CITED

The following references are of record in the file of this patent:

UNITED STATES PATENTS

| Number | Name | Date |
|---|---|---|
| 1,281,846 | Salari | Oct. 15, 1918 |
| 1,793,788 | Fick | Feb. 24, 1931 |
| 1,902,428 | Verstegen | Mar. 21, 1933 |
| 2,156,252 | Cichero | Apr. 25, 1939 |
| 2,233,918 | Fey | Mar. 4, 1941 |
| 2,276,700 | Provenzano | Mar. 17, 1942 |

FOREIGN PATENTS

| Number | Country | Date |
|---|---|---|
| 530,566 | France | Oct. 6, 1921 |